(12) United States Patent
Thubert et al.

(10) Patent No.: US 10,812,946 B2
(45) Date of Patent: Oct. 20, 2020

(54) RELIABLE LINK LAYER MULTICAST IN A LOW POWER WIDE AREA NETWORK

(71) Applicant: Cisco Technology, Inc., San Jose, CA (US)

(72) Inventors: Pascal Thubert, La Colle sur Loup (FR); Patrick Wetterwald, Mouans Sartoux (FR); Paul B Duffy, Acton, MA (US); Patrick Grossetete, Marcoussis (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 267 days.

(21) Appl. No.: 15/902,028

(22) Filed: Feb. 22, 2018

(65) Prior Publication Data

US 2019/0261138 A1   Aug. 22, 2019

(51) Int. Cl.
*H04W 4/06*      (2009.01)
*H04W 72/00*    (2009.01)
(Continued)

(52) U.S. Cl.
CPC ............. *H04W 4/06* (2013.01); *H04L 1/1685* (2013.01); *H04W 72/005* (2013.01); *H04W 74/0816* (2013.01); *H04W 84/22* (2013.01)

(58) Field of Classification Search
CPC ....................................................... H04W 4/06
See application file for complete search history.

(56) References Cited

U.S. PATENT DOCUMENTS 7,791,415 B2   9/2010  Hornbuckle 8,441,958 B2   5/2013  Thubert et al.
(Continued)

FOREIGN PATENT DOCUMENTS

CN         104219301 B     6/2017
CN         107071003 A     8/2017

OTHER PUBLICATIONS

Levis et al "Internet Engineering Task Force (IETF) Request for Comments: 6206 Category: Standards Track ISSN: 2070-1721; Mar. 2011 " (Year: 2011).*

(Continued)

*Primary Examiner* — Kodzovi Acolatse
*Assistant Examiner* — Abdeltif Ajid
(74) *Attorney, Agent, or Firm* — Leon R. Turkevich

(57) ABSTRACT

A management device for a low power wide area network can: generate and send, to each constrained wireless network device via a wired gateway, a link layer multicast listener command specifying a listening interval and causing each constrained wireless network device to change from a low-power optimized mode to a listening mode until reception of a multicast data packet within the listening interval; generate collision avoidance parameters including a minimum waiting interval, a maximum waiting interval relative to the listening interval, and a redundancy constant; and instruct the wired gateways to selectively transmit the multicast data packet based on the collision avoidance parameters, wherein each wired gateway responds by waiting a randomly-selected wait interval between the minimum and maximum waiting intervals, and selectively transmitting the multicast data packet only if a received number of the multicast data packet by the corresponding wired gateway is less than the redundancy constant.

20 Claims, 7 Drawing Sheets

(51) Int. Cl.
  *H04L 1/16* (2006.01)
  *H04W 74/08* (2009.01)
  *H04W 84/22* (2009.01)

(56) References Cited

U.S. PATENT DOCUMENTS

| | | | |
|---|---|---|---|
| 9,525,454 B2 | 12/2016 | Seller | |
| 9,800,288 B2 | 10/2017 | Seller et al. | |
| 2008/0170540 A1* | 7/2008 | Fukuda | H04B 3/542 370/328 |
| 2013/0121335 A1 | 5/2013 | Hui et al. | |
| 2015/0200870 A1 | 7/2015 | Hui et al. | |
| 2015/0373735 A1 | 12/2015 | Thubert et al. | |
| 2016/0094269 A1 | 3/2016 | Seller | |
| 2017/0019804 A1 | 1/2017 | Morchon et al. | |
| 2019/0182774 A1* | 6/2019 | Jain | H04W 52/0235 |

OTHER PUBLICATIONS

Clausen et al., "Performance analysis of Trickle as a flooding Mechanism", [online], Proceedings of ICCT2013, [retrieved on Nov. 23, 2017]. Retrieved from the Internet: URL: <http://www.thomasclausen.net/wp-content/uploads/2015/12/2013-ICCT-Performance-analysis-of-Trickle-as-a-flooding-mechanism.pdf>, 8 pages.
Minaburo et al., "LPWAN Static Context Header Compression (SCHC) and Fragmentation for IPv6 and UDP", [online], lpwan Working Group, Internet Draft, Dec. 22, 2017, [retrieved on Jan. 11, 2018]. Retrieved from the Internet: URL: <https://tools.ietf.org/pdf/draft-ietf-lpwan-ipv6-static-context-hc-09.pdf>, pp. 1-56.
Farrell, Ed., "LPWAN Overview", [online], lpwan Internet Draft, Oct. 3, 2017, [retrieved on Jan. 23, 2018]. Retrieved from the Internet: URL: <https://tools.ietf.org/pdf/draft-ietf-lpwan-overview-07.pdf>, pp. 1-41.
Brocaar, "Multicast downlink messages #227", [online], Aug. 19, 2017, [retrieved on Jan. 11, 2018]. Retrieved from the Internet: URL:<https://github.com/brocaar/loraserver/issues/227>, pp. 1-2.
Semtech, "What is LoRa?", [online], [retrieved on Jan. 12, 2018]. Retrieved from the Internet: URL: <https://www.semtech.com/technology/lora/what-is-lora>, pp. 1-3.
LoRa Alliance, "LoRa Specification", [online], 2015 LoRa Alliance, [retrieved on Jan. 12, 2018]. Retrieved from the Internet: URL: <https://www.rs-online.com/designspark/rel-assets/ds-assets/uploads/knowledge-items/application-notes-for-the-internet-of-things/LoRaWAN%20Specification%201R0.pdf>, pp. 1-82.
Pelov et al., "IPv6 over Low Power Wide-Area Networks (lpwan)", [online], Jan. 16, 2018, [retrieved on Jan. 23, 2018]. Retrieved from the Internet: URL: <https://datatracker.ietf.org/wg/lpwan/about/>, pp. 1-3.
Levis et al., "The Trickle Algorithm", Internet Engineering Task Force (IETF), Request for Comments: 6206, Mar. 2011, pp. 1-13.
Winter, et al., "RPL: IPv6 Routing Protocol for Low-Power and Lossy Networks", Internet Engineering Task Force (IETF), Request for Comments: 6550, Mar. 2012, pp. 1-157.
Hui et al., "Multicast Protocol for Low-Power and Lossy Networks (MPL)", Internet Engineering Task Force (IETF), Request for Comments: 7731, pp. 1-29.
Varga, "Multi-hop Energy Harvesting Wireless Sensor Networks: Routing and Low Duty-cycle Link Layer", [online], Aug. 7, 2006, [retrieved on Nov. 23, 2017]. Retrieved from the Internet: URL: <https://www.researchgate.net/publication/304678155_Multi-hop_Energy_Harvesting_Wireless_Sensor_Networks_routing_and_low_duty-cycle_link_layer>, 124 pages.
Wikipedia, "LPWAN", [online], Jan. 9, 2018, [retrieved on Jan. 12, 2018]. Retrieved from the Internet: URL: <https://en.wikipedia.org/w/index.php?title=LPWAN&printable=yes>, pp. 1-4.
Thubert et al., U.S. Appl. No. 15/258,484, filed Sep. 7, 2016.
Thubert et al., U.S. Appl. No. 15/446,705, filed Mar. 1, 2017.

* cited by examiner

US 10,812,946 B2

RELIABLE LINK LAYER MULTICAST IN A LOW POWER WIDE AREA NETWORK

TECHNICAL FIELD

The present disclosure generally relates to reliable link layer multicast in a low power wide area network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Low power wide area networks (LPWAN) are wireless technologies that can provide communications for very constrained network devices: "very constrained network devices" refer to very resource-constrained wireless transceiver devices (e.g., sensor "motes") that are (or can be) very-low cost (e.g., five U.S. Dollars ($5) or less), very-low throughput (e.g., half duplex 60 kbps peak uplink rate, 30 kbps peak downlink rate of packets limited to around 1600 bytes maximum transmission unit (MTU)), and that can have very-low power consumption requirements that permit battery-only operation for ten to fifteen (10-15) years or more. The Internet Engineering Task Force (IETF) LPWAN Working Group is investigating LPWAN technologies (e.g., LoRaWAN, Narrowband IoT, SIGFOX, etc.) that can provide large-scale deployment of such very constrained network devices, for example by providing large coverage areas (e.g., up to 164 dB maximum coupling loss) for a large number (e.g., fifty-five thousand) of very constrained network devices.

Large-scale deployment of very constrained network devices, however, requires that the LPWAN technologies impose substantial link constraints to minimize power consumption requirements, for example by utilizing very low bit rates (e.g., around 10 bit/sec. to 100 kilobits/sec.), messaging constraints (e.g., rates of about 0.1 message/minute to about 1 message/minute or less), etc. Hence, such link constraints of some LPWAN technologies can require single-hop wireless communications between a gateway and a very constrained network device, without use of any link layer mesh topology or any network layer routing topology overlying the wireless network medium; consequently, such link constraints may preclude deployments of a network layer (e.g., Internet Protocol (IP)) or network-based operations such as multicasting, IPv6, 6TiSCH, etc.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
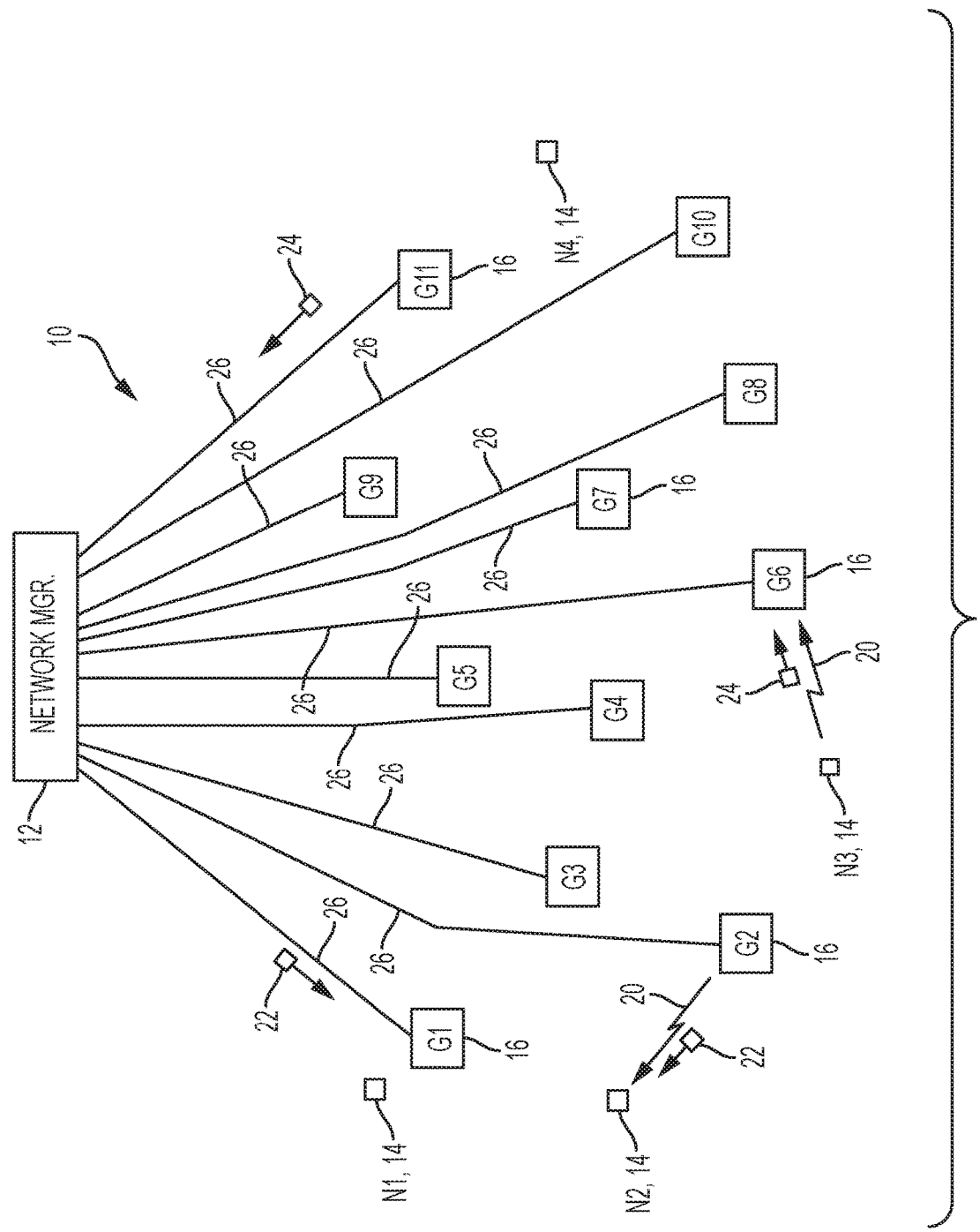
FIG. 1 illustrates an example low power wide area network having an apparatus for establishing reliable link-layer multicast among very constrained network devices based on establishing listening intervals via wired gateways executing selective transmission according to randomly-selected wait intervals and detected redundancy of a multicast packet, according to an example embodiment.

In one embodiment, a method comprises: generating and sending, by a management device for a low power wide area network comprising wired gateways and constrained wireless network devices each associated with one or more of the wired gateways via a link layer connection, a link layer multicast listener command to each constrained wireless network device via the associated wired gateway, the link layer multicast listener command specifying a listening interval selected by the management device, the link layer multicast listener command causing each constrained wireless network device in response to receipt thereof to change from a low-power optimized mode to a listening mode until reception of a multicast data packet within the listening interval; generating, by the management device, a set of collision avoidance parameters for execution by each wired gateway, the collision avoidance parameters including a minimum waiting interval, a maximum waiting interval relative to the listening interval, and a redundancy constant; and sending, by the management device, an instruction to the wired gateways to selectively transmit the multicast data packet based on the collision avoidance parameters, the instruction causing each wired gateway to wait a randomly-selected wait interval, relative to the minimum waiting interval and the maximum waiting interval, and after the wait interval selectively transmit the multicast data packet only if a received number of the multicast data packet by the corresponding wired gateway is less than the redundancy constant.

In another embodiment, one or more non-transitory tangible media are encoded with logic for execution by a machine and when executed by the machine operable for: generating and sending, by the machine implemented as a management device for a low power wide area network comprising wired gateways and constrained wireless network devices each associated with one or more of the wired gateways via a link layer connection, a link layer multicast listener command to each constrained wireless network device via the associated wired gateway, the link layer multicast listener command specifying a listening interval selected by the management device, the link layer multicast listener command causing each constrained wireless network device in response to receipt thereof to change from a low-power optimized mode to a listening mode until reception of a multicast data packet within the listening interval; generating, by the management device, a set of collision avoidance parameters for execution by each wired gateway, the collision avoidance parameters including a minimum waiting interval, a maximum waiting interval relative to the listening interval, and a redundancy constant; and sending, by the management device, an instruction to the wired gateways to selectively transmit the multicast data packet based on the collision avoidance parameters, the instruction causing each wired gateway to wait a randomly-selected wait interval, relative to the minimum waiting interval and the maximum waiting interval, and after the wait interval selectively transmit the multicast data packet only if a received number of the multicast data packet by the corresponding wired gateway is less than the redundancy constant.

In another embodiment, a method comprises receiving, by a wired gateway providing a wireless link layer connection for one or more constrained wireless network devices in a low power wide area network, a link layer multicast listener command for each of the one or more constrained wireless network devices, each link layer multicast listener command received via a wired connection with a management device and specifying a listening interval; transmitting, by the wired gateway, each link layer multicast listener command to the corresponding constrained wireless network device, the link layer multicast listener command causing the corresponding constrained wireless network device in response to receipt thereof to change from a low-power optimized mode to a listening mode until reception of a multicast data packet within the listening interval; receiving an instruction, from the management device, for selective transmission of the multicast data packet based on collision avoidance parameters specified in the instruction, the collision avoidance parameters including a minimum waiting interval, a maximum waiting interval relative to the listening interval, and a redundancy constant; and selectively transmitting, by the wired gateway, the multicast data packet based on randomly selecting a wait interval relative to the minimum waiting interval and the maximum waiting interval, waiting the wait interval following initiation of the listening interval, and after the wait interval selectively transmitting the multicast data packet only if the wired gateway has wirelessly received less than the redundancy constant of the multicast data packets from one or more other wired gateways.

In another embodiment, one or more non-transitory tangible media are encoded with logic for execution by a machine and when executed by the machine operable for: receiving, by the machine implemented as a wired gateway providing a wireless link layer connection for one or more constrained wireless network devices in a low power wide area network, a link layer multicast listener command for each of the one or more constrained wireless network devices, each link layer multicast listener command received via a wired connection with a management device and specifying a listening interval; transmitting, by the wired gateway, each link layer multicast listener command to the corresponding constrained wireless network device, the link layer multicast listener command causing the corresponding constrained wireless network device in response to receipt thereof to change from a low-power optimized mode to a listening mode until reception of a multicast data packet within the listening interval; receiving an instruction, from the management device, for selective transmission of the multicast data packet based on collision avoidance parameters specified in the instruction, the collision avoidance parameters including a minimum waiting interval, a maximum waiting interval relative to the listening interval, and a redundancy constant; and selectively transmitting, by the wired gateway, the multicast data packet based on randomly selecting a wait interval relative to the minimum waiting interval and the maximum waiting interval, waiting the wait interval following initiation of the listening interval, and after the wait interval selectively transmitting the multicast data packet only if the wired gateway has wirelessly received less than the redundancy constant of the multicast data packets from one or more other wired gateways.

DETAILED DESCRIPTION

FIG. 1 illustrates an example low power wide area network 10 having an apparatus (e.g., a network manager device, management device, network server device, etc.) 12 configured for establishing reliable link-layer multicast among very constrained network devices (e.g., "N1" to "N4") 14 based on establishing listening intervals (30 of FIG. 5) via wired gateway devices (e.g., "G1" through "G11") 16, according to an example embodiment: the wired gateways 16 are configured for executing, within the established listening intervals 30, selective transmission of a multicast packet (18 of FIG. 2) via wireless data links 20 according to randomly-selected wait intervals and detected redundancy.

Particular embodiments enable very constrained wireless network devices (i.e., constrained wireless network devices) 14 to reliably receive one or more multicast data packets 18 in a low power wide area network 10 based on link layer multicast listener commands 22 generated by a management device 12, with minimal power requirements for the very constrained wireless network devices 14. The management device 12 can generate and send, to each very constrained wireless network device (e.g., "N1") 14, a corresponding link layer multicast listener command 22 via a wired gateway (e.g., "G1") 16 associated with the very constrained wireless network device (e.g., "N1") 14: the wired gateway (e.g., "G2") can execute a unicast transmission of the corresponding link layer multicast listener command 22 to the very constrained wireless network device (e.g., "N2") 14 via a link layer connection implemented as a wireless data link 20.

As described below, the link layer multicast listener command 22 can cause the very constrained wireless network device 14 to change from a low-power optimized mode (e.g., LoRa Class A or B) to a listening mode until reception of a multicast data packet 18 within a listening interval 30 specified in the link layer multicast listener command 22. A constrained wireless network device (e.g., "N3") 14 also can transmit a listener command acknowledgement 24 to the management device 12 via the corresponding associated wired gateway (e.g., "G6"); hence, a wired gateway (e.g., "G11") can forward a received listener command acknowledgement 24 (e.g., from a constrained wireless network device "N4" 14) to the management device 12 via a wired data link 26.

Figure 2:
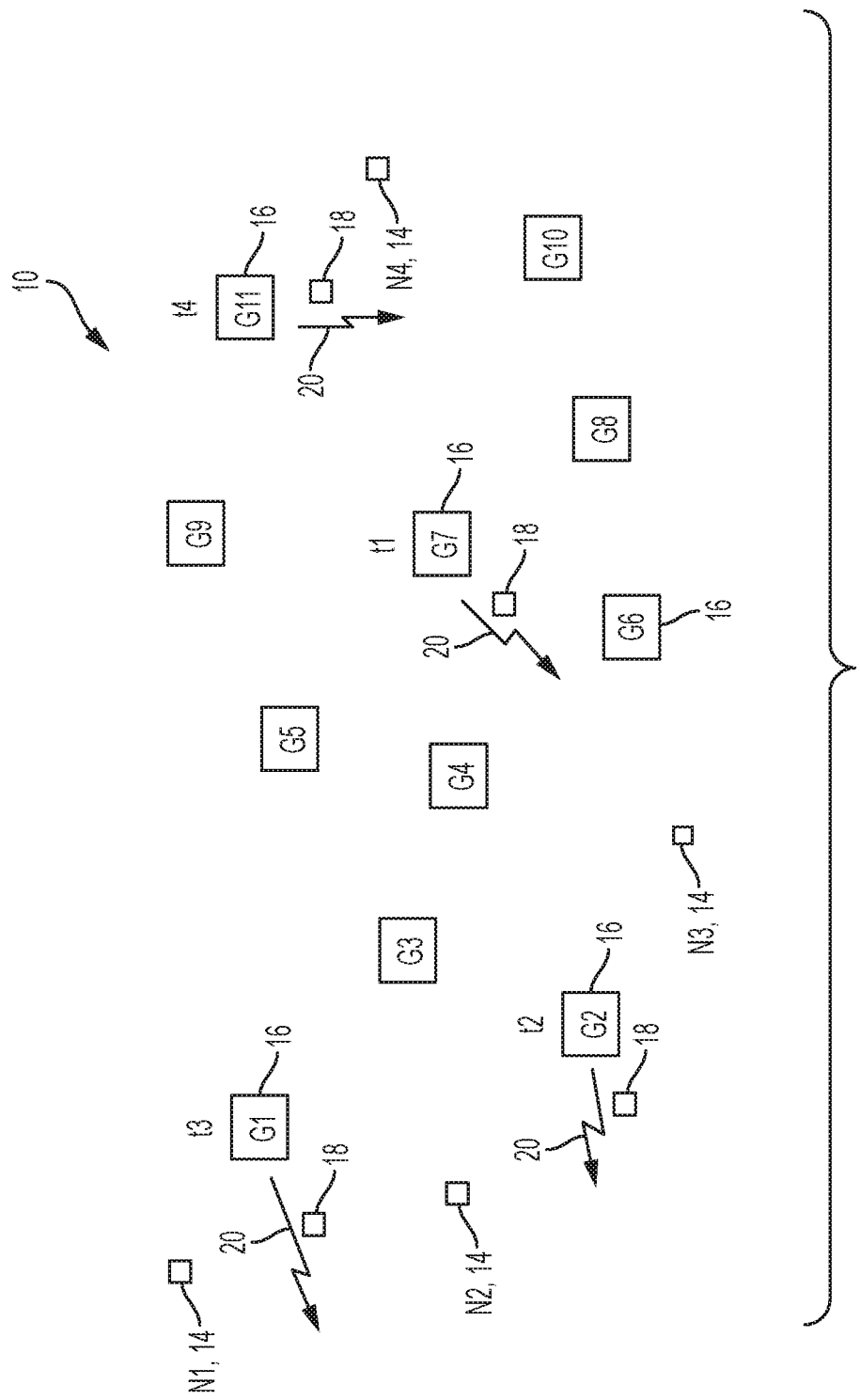
FIG. 2 illustrates the wired gateways of FIG. 1 executing the selective transmission during a listening interval according to the randomly-selected wait intervals and the detected redundancy of the multicast packet, according to an example embodiment.

The management device 12 also can generate a set of collision avoidance parameters for execution by each wired gateway 16, including for example a minimum waiting interval (Imin), a maximum waiting interval (Imax), and a redundancy constant (k), for example according to the Trickle algorithm specified in the IETF Request for Comments (RFC) 6206. As illustrated in FIG. 2, the collision avoidance parameters can cause the wired gateways 16 to selectively transmit a multicast data packet (e.g., according to the Trickle algorithm), enabling the wired gateways 16 to multicast the multicast data packet 18 among the very constrained wireless network devices 14 operating in listening mode during the listening interval 30.

As described in further detail below, FIG. 2 illustrates that within the listening interval 30 for a corresponding multicast packet 18, at time "t=t1" a wired gateway "G7" 16 can wirelessly transmit the multicast data packet 18, at time "t=t2" (t2>t1) the wired gateway "G2" 16 can wireless transmit the same multicast data packet 18 after the wired gateway "G7" 16, at time "t=t3" (t3>t2) the wired gateway "G1" 16 can wireless transmit the same multicast data packet 18 after the wired gateway "G2" 16, and at time "t=t4" (t4>t3) the wired gateway "G11" 16 can wireless transmit the same multicast data packet 18 after the wired gateway "G1" 16. The management device 12 and the wired data links 26 are omitted from FIG. 2 to avoid cluttering the Figure.

The management device 12 can provide LPWAN link constraints in the low power wide area network 10 to minimize power consumption requirements of the constrained wireless network devices 14: example LPWAN link constraints can include very low bit rates, messaging constraints, and deployment of the wired gateways 16 to provide single-hop wireless communications with the constrained wireless network devices 14 via wireless data links 20 on a wireless network medium, without the use of any link layer mesh topology or any network layer routing topology overlying the wireless network medium. Hence, the management device 12 can establish the reliable link layer multicast as described herein without any link layer mesh topology or any network layer routing topology or any routing protocol such as the Routing Protocol for Low Power and Lossy Networks (RPL) as described in RFC 6550, etc.

Hence, example embodiments enable reliable transmission of multicast data packets 18 in a low power wide area network 10 that can be implemented as a mesh-free and network topology-free network, based on the management device 12 establishing listening intervals 30 for respective multicast data packets 18, enabling a very constrained wireless network device 14 to change from a low-power optimized mode to a listening mode until reception of the multicast data packet 18. As described below, example embodiments further enable each very constrained wireless network device 14 to enter or resume the low-power optimized mode in response to receipt of the multicast data packet 18, until initiation of the next listening interval 30 that can be selected and identified by the management device 12 at or before transmission of the multicast data packet 18. The example embodiments also ensure the wired gateways 16 can provide reliable link layer multicast of the multicast data packet 18 based on the redundancy constant, while avoiding collisions.

Although only the wired gateways "G1", "G2", "G6", "G7", and "G11" are labeled with the reference numeral "16" in FIGS. 1-2 to avoid cluttering in the Figures, it should be apparent that all the wired gateways "G1" through "G11" are allocated the reference numeral "16" for purposes of the description herein. Further, it should be apparent that all the wired gateways "G1" through "G11" are configured for establishing wireless data links 20, even though only the wired gateways "G1", "G2", "G6", "G7", and "G11" are shown in FIGS. 1-2 to have wireless data links 20 to avoid cluttering in the Figures. Further, each of the constrained wireless network devices 14 is configured for establishing a wireless data link 20, even though only the constrained wireless network device "N3" is shown in FIG. 1 to have a wireless data link 20 to avoid cluttering in the Figures.

Figure 3:
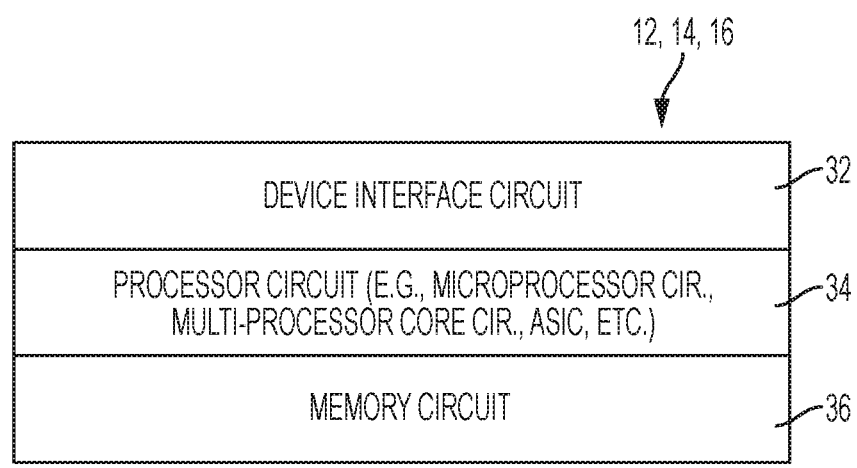
FIG. 3 illustrates an example implementation of any one of the management device, wired gateways, or very constrained network devices of FIG. 1, according to an example embodiment.

FIG. 3 illustrates an example implementation of any one of the devices 12, 14, and/or 16, according to an example embodiment. Each apparatus 12, 14, and/or 16 is a physical machine (i.e., a hardware device) configured for implementing network communications with other physical machines via the low power wide area network 10.

Each apparatus 12, 14, and/or 16 can include a device interface circuit 32, a processor circuit 34, and a memory circuit 36. The device interface circuit 32 can include one or more distinct physical layer transceivers for communication with any one of the other devices 12, 14, and/or 16; the device interface circuit 32 also can include an IEEE based Ethernet transceiver for communications with the devices of FIG. 1 via any type of data link (e.g., a wired or wireless link, an optical link, etc.). The processor circuit 34 can be configured for executing any of the operations described herein, and the memory circuit 36 can be configured for storing any data or data packets as described herein. The term "configured for" or "configured to" as used herein with respect to a specified operation refers to a device and/or machine that is physically constructed and arranged to perform the specified operation.

Any of the disclosed circuits of the devices 12, 14, and/or 16 (including the device interface circuit 32, the processor circuit 34, the memory circuit 36, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 36) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 36 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 36 can be implemented dynamically by the processor circuit 34, for example based on memory address assignment and partitioning executed by the processor circuit 34.

Figure 4A:
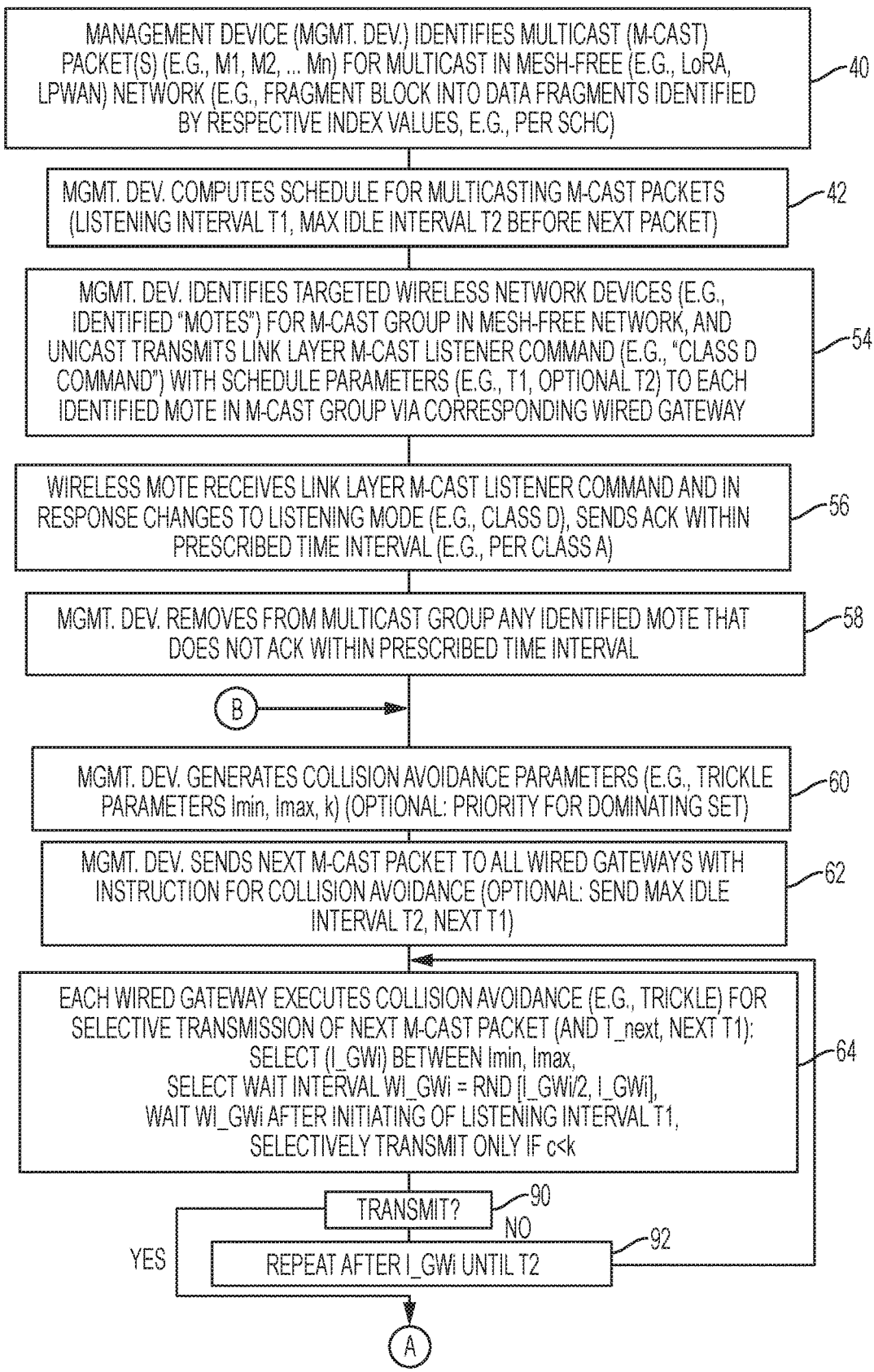
FIGS. 4A and 4B illustrate a method of establishing reliable link-layer multicast among very constrained network devices via wired gateways, according to an example embodiment.
Figure 4B:
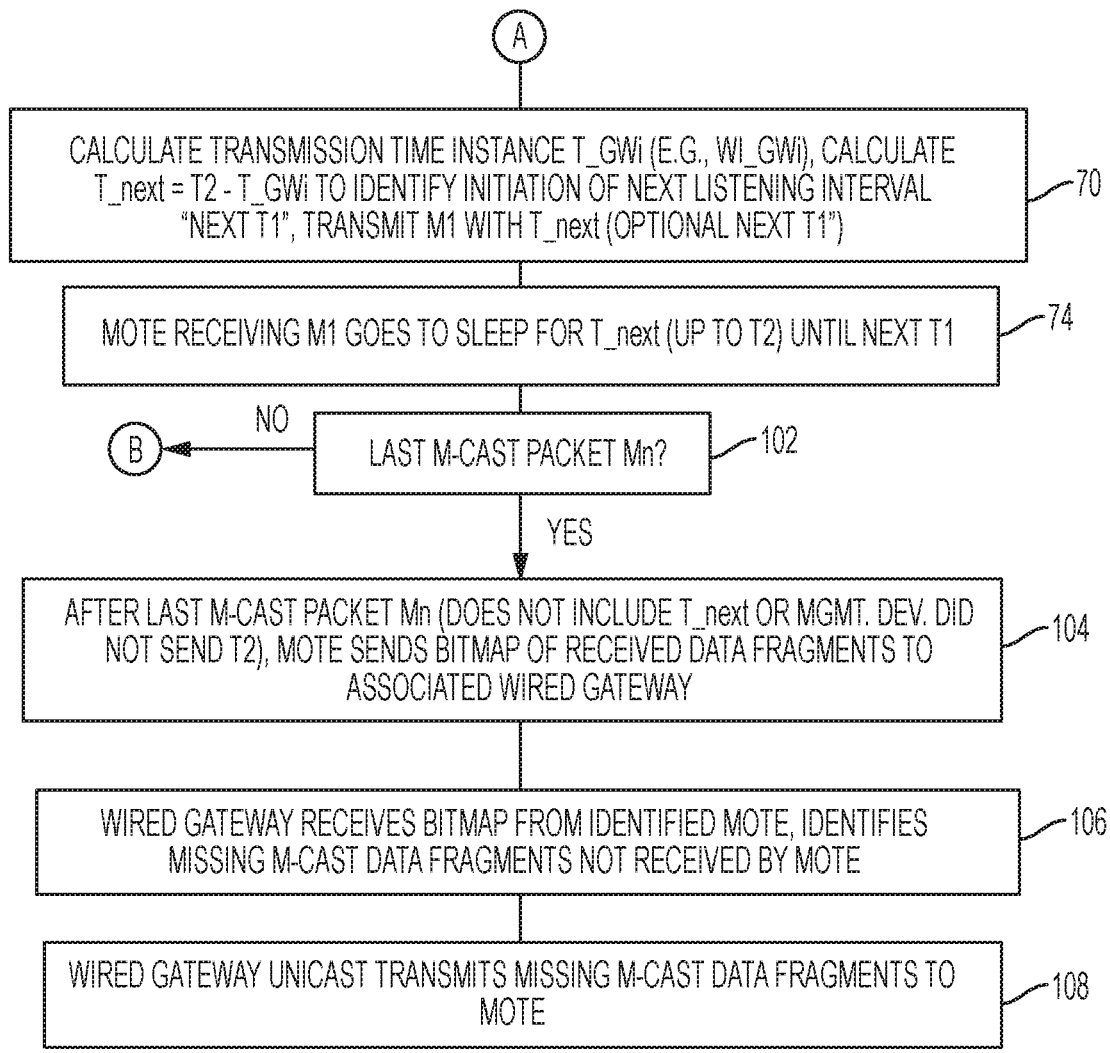

FIGS. 4A and 4B illustrate a method of establishing reliable link-layer multicast among very constrained network devices via wired gateways, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4A, the processor circuit 34 of the management device 12 in operation 40 is configured for identifying one or more multicast data packets (e.g., M1, M2, . . . . Mn) 18 for multicasting in the low power wide area network 10, described previously as a mesh-free network and network topology-free network (e.g., according to LoRA, LPWAN, etc.). For example, the wired device interface circuit 32 of the management device 12 in operation 40 can receive a data structure from an external source (e.g., a server device via a local and/or wide area network such as the Internet), and the processor circuit 34 of the management device 12 can determine that the data structure (e.g., comprising executable code and/or data parameters) needs to be fragmented into data fragments for multicast transmission to the constrained wireless network devices 14 as multicast data packets (e.g., M1, M2, M3) 18. Hence, the processor circuit 34 of the management device 12 in operation 40 can fragment the data structure into identified multicast data packets (e.g., M1, M2, M3). The data fragments can be identified by respective index values, for example using LPWAN Static Context Header Compression (SCHC).

Figure 5:
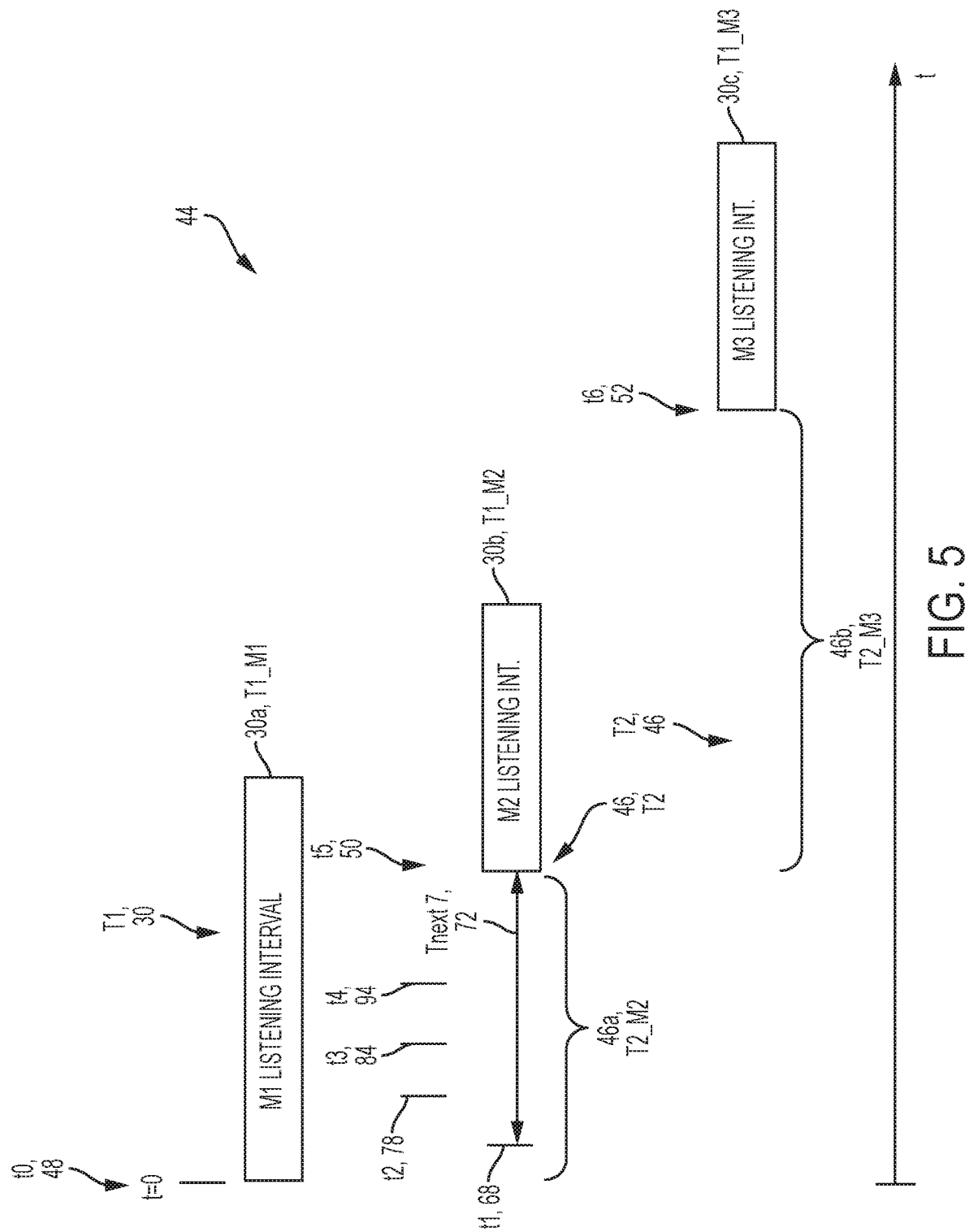
FIG. 5 illustrates a timing diagram of the listening intervals established by the management device of FIG. 1 for respective multicast packets, maximum idle intervals between successively-multicast packets, transmission time instances by wired gateways, and next-listening intervals based on the transmission time instances, according to an example embodiment.

As illustrated in FIG. 5, The processor circuit 34 of the management device 12 in operation 42 can compute a schedule 44 for multicasting the multicast data packets 18, where the schedule 44 comprises a listening interval "T1" 30 for each multicast data packet 18. For example, the processor circuit 34 of the management device 12 in operation 42 can establish the listening interval "T1_M1" 30a for the multicast data packet "M1" 18, the listening interval "T1_M2" 30b for the multicast data packet "M2" 18, and the listening interval "T1_M3" 30c for the multicast data packet "M3" 18. The processor circuit 34 of the management device 12 can determine that the listening intervals 30a, 30b, and/or 30c have the same time duration, or different time durations, as appropriate.

The processor circuit 34 of the management device 12 in operation 42 also can determine that the schedule 44 comprises zero or more time separations (i.e., maximum idle intervals) (e.g., "T2" 46) between initiation of a first listening interval (e.g., 30a) at event "t0" (i.e., t=0) 48 for a multicast data packet (e.g., "M1") 18 and initiation of a second listening interval (e.g., 30b) at event "t5" 50 for a second multicast data packet (e.g., "M2") 18. A time separation value of "T2=0" 46 can be set to represent simultaneous initiation of the first listening interval (e.g., 30a) for the first multicast data packet (e.g., "M1") and the second listening interval (e.g., 30b) for the second multicast data packet (e.g., "M2").

As illustrated in FIG. 5, the processor circuit 34 of the management device 12 in operation 42 can set a time separation "T2_M2" 46a corresponding to initiation of the listening interval "T1_M2" 30b at event "t5" 50 following the initiation of the listening interval "T1_M1" 30a at event 48; the processor circuit 34 of the management device 12 in operation 42 also can set a time separation "T2_M3" 46b corresponding to initiation of the listening interval "T1_M3" at event "t6" 52 following the initiation of the listening interval "T1_M2" 30b at event "t5" 50. The processor circuit 34 of the management device 12 can set each time separation 46 to a value of zero or more milliseconds, seconds, etc.

The processor circuit 34 of the management device 12 in operation 54 of FIG. 4A can identify targeted constrained wireless network devices 14 (e.g., identified "motes" 14) for a multicast group in the mesh-free low power wide area network 10. The processor circuit 34 of the management device 12 can generate, for each constrained wireless network device 14 in the multicast group, a corresponding link layer multicast listener command 22 specifying the corresponding listening interval "T1" 30 for the associated multicast data packet 18, and the processor circuit 34 of the management device 12 in operation 54 can unicast transmit the link layer multicast listener command 22 to the corresponding targeted constrained wireless network device (e.g., "N1" of FIG. 1) 14 via the associated wired gateway (e.g., "G1") 16.

In one embodiment, the link layer multicast listener command 22 can be implemented as a LoRa "Class D" command that causes a constrained wireless network device 14 to respond to receipt of the link layer multicast listener command 22 by changing from a low-power optimized mode (e.g., LoRa Class A or LoRa Class B) to a listening mode until reception of the associated multicast data packet 18 within the listening interval 30. As illustrated in FIG. 1, the device interface circuit 32 of the management device 12 can transmit the link layer multicast listener commands 22 via the wired data links 26, enabling the management device 12 to unicast transmit in operation 54 a link layer multicast listener command 22 to each constrained wireless network device 14 via an associated wired gateway 16 (e.g., "N1"14 via "G1" 16, "N2" 12 via "G2" 16, "N3" 12 via "G6" 16, and "N4" 14 via "G11" 16). Each link layer multicast listener command 22 generated by the management device 12 can specify the listening interval 30 (e.g., "T1_M1" 30a) for the next multicast data packet (e.g., "M1") 18; each link layer multicast listener command 22 generated by the management device 12 also can optionally include the maximum idle interval (e.g., "T2_M2" 46a) that identifies the initiation of the next listening interval (e.g., "T1_M2" 30b).

The processor circuit 34 of the management device 12 can cause transmission of the link layer multicast listener command 22 to a corresponding constrained wireless network device 14, for example, in response to receiving a data packet from the constrained wireless network device 14 operating in low-power mode (e.g., LoRa Class A). A constrained wireless network device 14 operating under LoRa Class A or Class B operation includes two or more listen windows following transmission by the constrained wireless network device 14, hence the management device 12 can unicast the link layer multicast listener command 22 within one of the two LoRa Class A/B listen windows to enable the constrained wireless network device 14 to receive the link layer multicast listener command 22 within one of its LoRa Class A/B listen windows.

Each constrained wireless network device 14 can respond in operation 56 to reception of link layer multicast listener command 22 by changing from the low-power optimized mode to the listening mode until reception of the multicast data packet 18.

Each constrained wireless network device 14 also can respond to the unicast link layer multicast listener command 22 by transmitting in operation 56 a listener command acknowledgement 24 to the management device 12 via the associated wired gateway 16 within a prescribed time interval. The processor circuit 34 of the management device 12 in operation 58 optionally can remove from the multicast group any constrained wireless network device 14 that does not send a corresponding listener command acknowledgement 24 within a prescribed time interval following unicast transmission of the link layer multicast listener command 22.

The processor circuit 34 of the management device 12 in operation 60 can generate collision avoidance parameters for selective transmission of a multicast data packet 18 by the wired gateways 16 within a corresponding listening interval 30. In one embodiment, the collision avoidance parameters can include Trickle parameters in accordance with RFC 6206, including a minimum waiting interval "Imin", a maximum waiting interval "Imax" that is based on the listening interval 30, and a redundancy constant "k". As described below, each of the wired gateways 16 can selectively transmit a multicast data packet 18 based on the collision avoidance parameters "Imin", "Imax", and "k", where a given wired gateway "Gi" 16 can selectively transmit a multicast data packet 18 only if, after waiting a randomly-selected wait interval "WI_GWi" following initiation of the corresponding listening interval "T1" 30, the given wired gateway "Gi" 16 has received no more than a number "c" of the multicast data packets 18 that is less than the redundancy constant "k" (i.e., c<k).

The processor circuit 34 of the management device 12 can set the maximum waiting interval "Imax" relative to the listening interval 30 for the multicast packet, and relative to the redundancy constant "k", enabling each constrained wireless network device 14 to "stay awake" to listen for one or multiple Trickle iterations. As described below, the relationship between a listening interval (e.g., "T1_M_1") 30 and the maximum waiting interval "Imax" can be set such that the listening interval 30 is equal to one or more maximum waiting interval iterations, e.g., the listening interval 30 can equal any one of "Imax", "3*Imax", "7*Imax", etc., enabling a constrained wireless network device 14 to listen for multiple Trickle iterations "Imax", then "2*Imax", then "3*Imax", etc., as appropriate (the symbol "*" represents a multiplication operation).

In one embodiment, the processor circuit 34 of the management device 12 sets the same collision avoidance parameters for all wired gateways 16 for all multicast data packets 18; in another embodiment, the management device 12 can use the same collision avoidance parameters for all wired gateways 16 for a given multicast data packet 18, but change the collision parameters for different multicast data packets 18 within the respective listening intervals 30 (e.g., selective transmission of multicast packets "M1", "M2", and "M3" within the respective listening intervals 30a, 30b, and 30c can be based on different collision avoidance intervals); in another embodiment, the management device 12 can use different sets of collision avoidance parameters for different wired gateways 16, for example wired gateways 16 identified as belonging to a "dominating set" (DS) can have higher-priority collision avoidance parameters that result in lower wait intervals "WI_GWi_DS" relative to any wait intervals "WI_GWi" of non-dominating set members. Other variations of collision avoidance parameters can be established by the processor circuit 34 of the management device 12 for any one or more multicast data packet 18 and/or any one or more wired gateway 16.

The processor circuit 34 of the management device 12 in operation 62 can send the next multicast data packet (e.g., "Ml") 18 via the wired data link 26 to all the wired gateways 16 prior to the initiation of the corresponding listening interval (e.g., "T1_M_1" 30a) (e.g., at event "t0" 48). The device interface circuit 32 of the management device 12 in operation 62 also can send, prior to initiation of the corresponding listening interval (e.g., at event "t0" 48), an instruction to the wired gateways 16 to execute the selective transmission of the next multicast data packet (e.g., "M1") based on the collision avoidance parameters.

Figure 6:
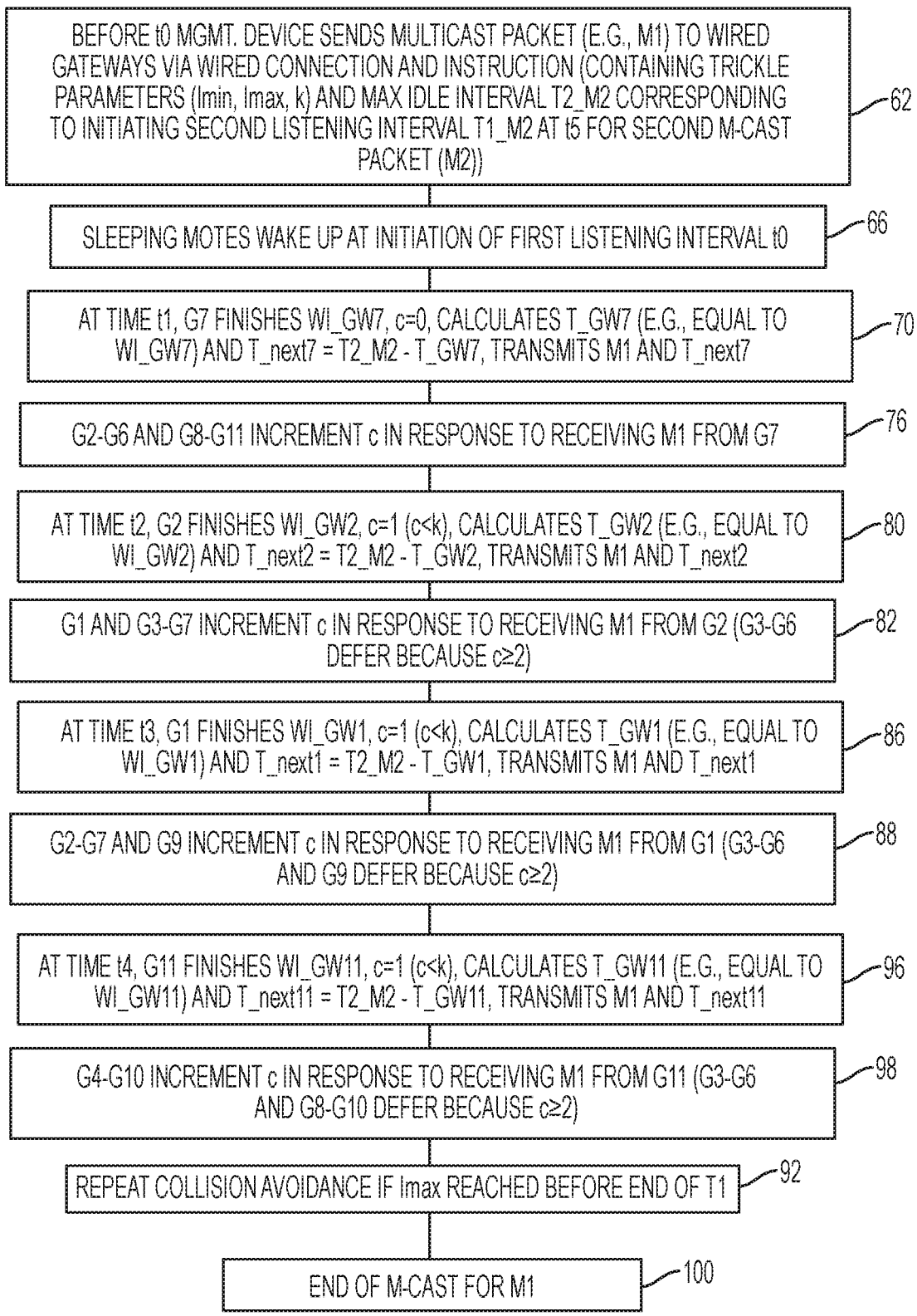
FIG. 6 illustrates an example of the selective transmission by the wired gateways, according to an example embodiment.

As illustrated in the example sequence diagram in FIG. 6, the management device 12 in operation 62 can send (by event "t0" 48) the multicast data packet "Ml" 18 and the instructions containing the collision avoidance parameters "Imin", "Imax", and "k" to each wired gateway 16; the management device 12 also can output to each wired gateway 16 (by event "t0" 48) the maximum idle interval "T2_M2" 46a that identifies the initiation of the listening interval "T1_M2" at event "t5" 50.

The processor circuit 34 of each wired gateway 16 is configured for responding to the instruction (containing the collision avoidance parameters) by executing in operation 64 the collision avoidance method for selective transmission of the multicast data packet (e.g., "M1") 18. For example, each wired gateway "Gi" 16 (where "i=1 to 11" for any of the wired gateways "G1" through "G11") can be configured for operating according to the Trickle algorithm under RFC 6206; hence, the processor circuit 34 of each wired gateway "Gi" 16 can randomly set an interval "I_GWi" to a value in the range between [Imin, Imax] (i.e., "Imin≤I_GWi≤Imax"); at the beginning of a collision avoidance interval the processor circuit 34 of each wired gateway "Gi" 16 also can select a randomly-selected wait interval "WI_GWi" relative to the minimum waiting interval "Imin" and the maximum waiting interval "Imax" (i.e., between one half the interval "I_GWi" and the interval "I_GWi"), for example where "WI_GWi=RND [I_GWi/2, I_GWi]" (i.e., "I_GWi/2≤WI_GWi≤I_GWi") (and "Imin≤I_GWi≤Imax").

Hence, each wired gateway "Gi" 16 in operation 64 randomly selects an interval "I_GWi" between [Imin, Imax], and each wired gateway "Gi" 16 in operation 64 randomly selects its wait interval "WI_GWi" between "I_GWi/2" and "I_GWi" (the symbol "/" represents a division operation).

Consequently, at the beginning of the listening interval "T1_M1" 30a at event "t0" 48 each constrained wireless network device 14 can wake up at operation 66 of FIG. 6, and each wired gateway 16 can begin waiting its corresponding wait interval "WI_GWi".

As illustrated in FIGS. 2, 5, and 6, at event "t1" 68 the wired gateway "G7" 16 can complete its wait interval "WI_GW7" and determine in operation 64 of FIG. 4A that its receive counter "c" equals zero, indicating no other copies of the multicast data packet "M1" have been received by the wired gateway "G7" 16 from any other wired gateway 16; hence, its counter "c" is less than the redundancy constant "k=2", i.e., "c<k". Hence, the wired gateway "G7" 16 in operation 90 of FIG. 4A and operation 70 of FIG. 4B and FIG. 6 can determine its transmission time instance "T_GW7" for the multicast data packet "M1" 18, and determine a next-listening interval "Tnext7" 72 as the difference between the maximum idle interval "T2_M2" 46a minus the transmission time instance "T_GWi" (e.g., "Tnext7=T2_M2−T_GW7").

The processor circuit 34 of the device interface circuit 32 of the wired gateway "G7" 16 in operation 70 of FIGS. 4B and 6 can cause its wireless device interface circuit 32 to transmit the multicast data packet "M1" and the next-listening interval "Tnext7" 72 at event "t1" 68 via the wireless data link 20. Hence, any constrained wireless network device (e.g., "N3") 14 that can detect the transmission by the wired gateway "G7" 16 at the event "t1" 68 can respond to receiving the multicast data packet "M1" and the next-listening interval "Tnext7" 72 in operation 74 by entering a low-power optimized mode (e.g., "sleep mode" under Lora Class A), and resuming the listening mode upon initiation of the second listening interval at event "t5" 50 as identified by the next-listening interval "Tnext7" 72.

As illustrated in FIG. 6, each of the wired gateways 16 that detect the wireless transmission of the multicast data packet "M1" by the wired gateway "G7" 16 at the event "t1" 68 (e.g., wired gateways "G2" through "G6" and "G8" through "G11") respond in operation 76 by incrementing their respective receive counters "c".

Assume the wired gateway "G2" is the next gateway that completes its wait interval. As illustrated in FIGS. 2, 5, and 6, at event "t2" 78 the wired gateway "G2" 16 can complete its wait interval "WI_GW2" and determine in operation 64 of FIG. 4A (80 of FIG. 6) that its receive counter "c" equals one ("c=1") and is less than the redundancy constant "k=2" (i.e., "c<k"). Hence, the wired gateway "G2" 16 in operation 70 of FIG. 4B (80 of FIG. 6) can determine its transmission time instance "T_GW2" for the multicast data packet "M1" 18, and determine a next-listening interval "Tnext2" (not shown in FIG. 5) as the difference between the maximum idle interval "T2_M2" 46a minus the transmission time instance "T_GWi" (e.g., "Tnext2=T2_M2−T_GW2").

The processor circuit 34 of the device interface circuit 32 of the wired gateway "G2" 16 in operation 70 of FIG. 4B (operation 80 of FIG. 6) can cause its wireless device interface circuit 32 to transmit the multicast data packet "M1" and the next-listening interval "Tnext2" at event "t2" 78 via the wireless data link 20. Hence, any constrained wireless network device (e.g., "N1" and/or "NT") 14 that can detect the transmission by the wired gateway "G2" 16 at the event "t2" 78 can respond to receiving the multicast data packet "M1" and the next-listening interval "Tnext2" in operation 74 by entering a low-power optimized mode (e.g., "sleep mode" under Lora Class A), and resuming the listening mode upon initiation of the second listening interval at event "t5" 50 as identified by the next-listening interval "Tnext2".

As illustrated in FIG. 6, each of the wired gateways 16 that detect the wireless transmission of the multicast data packet "M1" by the wired gateway "G2" 16 at the event "t2" 78 (e.g., wired gateways "G1" and "G3" through "G7") respond in operation 82 by incrementing their respective receive counters "c".

Assume the wired gateway "G1" is the next gateway that completes its wait interval. As illustrated in FIGS. 2, 5, and 6, at event "t3" 84 the wired gateway "G1" 16 can complete its wait interval "WI_GW1" and determine in operation 64 of FIG. 4A (86 of FIG. 6) that its receive counter "c" equals one ("c=1") and is less than the redundancy constant "k=2" (i.e., "c<k"). Hence, the wired gateway "G1" 16 in operation 70 of FIG. 4B (86 of FIG. 6) can determine its transmission time instance "T_GW1" for the multicast data packet "M1" 18, and determine a next-listening interval "Tnext1" (not shown in FIG. 5) as the difference between the maximum idle interval "T2_M2" 46a minus the transmission time instance "T_GWi" (e.g., "Tnext1=T2_M2−T_GW1").

The processor circuit 34 of the device interface circuit 32 of the wired gateway "G1" 16 in operation 70 of FIG. 4B (operation 86 of FIG. 6) can cause its wireless device interface circuit 32 to transmit the multicast data packet "M1" and the next-listening interval "Tnext1" at event "t3" 84 via the wireless data link 20. Hence, any constrained wireless network device 14 that can detect the transmission by the wired gateway "G1" 16 at the event "t3" 84 can respond to receiving the multicast data packet "M1" and the next-listening interval "Tnext1" in operation 74 by entering a low-power optimized mode (e.g., "sleep mode" under Lora Class A), and resuming the listening mode upon initiation of the second listening interval at event "t5" 50 as identified by the next-listening interval "Tnext1".

As illustrated in FIG. 6, each of the wired gateways 16 that detect the wireless transmission of the multicast data packet "M1" by the wired gateway "G1" 16 at the event "t3" 84 (e.g., wired gateways "G2" through "G7" and "G9") respond in operation 88 by incrementing their respective receive counters "c". As noted in FIG. 6, the wired gateways "G3" through "G6" and "G9" 16 defer from any transmission during their current idle interval "I_GWi" in response to determining their receive counters exceed the redundancy constant "k=2" (i.e., c≥2). Hence, the wired gateways "G3" through "G6" and "G9" 16 in operation 90 of FIG. 4A determine they cannot transmit in response to their receive counters equaling or exceeding the redundancy constant, and in response wait in operation 92 until they can repeat the next collision avoidance interval, for example as described in RFC 6206.

Assume the wired gateway "G11" is the next gateway that completes its wait interval. As illustrated in FIGS. 2, 5, and 6, at event "t4" 94 the wired gateway "G11" 16 can complete its wait interval "WI_GW11" and determine in operation 64 of FIG. 4A (96 of FIG. 6) that its receive counter "c" equals one ("c=1") and is less than the redundancy constant "k=2" (i.e., "c<k"). Hence, the wired gateway "G11" 16 in operation 70 of FIG. 4B (96 of FIG. 6) can determine its transmission time instance "T_GW11" for the multicast data packet "M1" 18, and determine a next-listening interval "Tnext11" (not shown in FIG. 5) as the difference between the maximum idle interval "T2_M2" 46a minus the transmission time instance "T_GWi" (e.g., "Tnext1=T2_M2−T_GW11").

The processor circuit 34 of the device interface circuit 32 of the wired gateway "G11" 16 in operation 70 of FIG. 4B (operation 96 of FIG. 6) can cause its wireless device interface circuit 32 to transmit the multicast data packet "M1" and the next-listening interval "Tnext11" at event "t4" 94 via the wireless data link 20. Hence, any constrained wireless network device (e.g., "N4") 14 that can detect the transmission by the wired gateway "G11" 16 at the event "t4" 94 can respond to receiving the multicast data packet "M1" and the next-listening interval "Tnext11" in operation 74 by entering a low-power optimized mode (e.g., "sleep mode" under Lora Class A), and resuming the listening mode upon initiation of the second listening interval at event "t5" 50 as identified by the next-listening interval "Tnext11".

As illustrated in FIG. 6, each of the wired gateways 16 that detect the wireless transmission of the multicast data packet "M1" by the wired gateway "G11" 16 at the event "t4" 94 (e.g., wired gateways "G4" through "G10") can respond in operation 98 by incrementing their respective receive counters "c". As noted in FIG. 6, the wired gateways "G3" through "G6" and "G8" through "G10" 16 defer from any transmission during their current idle interval "I_GWi" in response to determining their receive counters exceed the redundancy constant "k=2" (i.e., c≥2). Hence, the wired gateways "G3" through "G6" and "G8" through "G10" 16 in operation 90 of FIG. 4A determine they cannot transmit in response to their receive counters equaling or exceeding the redundancy constant, and wait in operation 92 until they can repeat the next collision avoidance interval. Hence, all the wired gateways "G1" through "G11" wait until the repeating next idle interval in operation 92, or until expiration of the listening interval 30a at operation 100.

The above-described method can be repeated for each listening interval (e.g., "T1_M2" 30b, "T1_M3" 30c) of the corresponding multicast data packet (e.g., "M2", "M3") 18, until the last multicast data packet (e.g., "M3") has been multicast in its corresponding listening interval 30c in operation 102, except that in one embodiment, for the last data packet "M3", no time separation 46 would be transmitted by the management device 12, nor would any wired gateway 16 transmit a next-listening interval 72 with the last multicast data packet "M3", to notify each constrained wireless network device 14 that the next multicast data packet "M3" is the last multicast data packet in the sequence of multicast data packets associated with the data structure that was fragmented by the network manager 12 in operation 40. Hence, each wired gateway 16 can identify the last multicast data packet (e.g., "M3") in response to a determined absence of a time separation "T2" accompanying the instructions sent by the management device 12 in operation 62 with the next data packet "M3"; alternately, each constrained wireless network device 14 can detect the last multicast data packet "M3" 18 in response to a determined absence of the time separation "T2" 46 (by the management device 12) and/or a determined absence of the next-listening interval 72 (by a wired gateway 16 transmitting the multicast data packet "M3").

Alternately, the instructions can include a "last" flag indicating the last multicast data packet in the sequence of multicast data packets, where the parameter "T2" can be used to specify the final duration of multicasting any of the multicast data packets in the sequence of multicast data packets (i.e. when all listening intervals for respective multicast data packets are to be terminated).

Following multicasting of the last multicast data packet (e.g., "M3") 18, each constrained wireless network device 14 in operation 104 can unicast transmit a bitmap of the received multicast data packets to its associated wired gateway 16, where each bit corresponds to a received multicast data packet; each constrained wireless network device 14 also can unicast transmit its bitmap in response to detecting that all listening intervals for the respective multicast packets have been terminated. In response to a wired gateway 16 receiving a bitmap from an identified constrained wireless network device 14, the wired gateway 16 in operation 106 can identify from the received bitmap any missing multicast data fragments, and in response the wired gateway 16 can unicast transmit in operation 108 the missing multicast data packet(s) to the constrained wireless network device 14 to ensure reliable delivery of all the multicast data packets 18. In an alternate embodiment, each bitmap generated by the corresponding constrained wireless network device 16 can be forwarded by a wired gateway 16 to the management device 12, and the management device 12 can cause a selected one of the wired gateways 16 to unicast transmit the one or more missing data fragments to the corresponding constrained wireless network device 16. The unicast transmission of the bitmap and missing multicast data packets can be implemented, for example, using LPWAN Static Context Header Compression (SCHC).

In another embodiment, a wired gateway 16 can detect from a prescribed number of received bitmaps from respective constrained wireless network devices 14 that a repeat multicast of a missing fragment would be preferable to repeated unicast transmissions of the missing fragment, and in response send a request to the management device 12 for a repeat multicast of the missing fragment. The management device 12, in response to receiving the repeat multicast request from an identified wired gateway 16, can send an instruction to the identified wired gateway 16 for executing a repeat multicast transmission of the missing fragment.

According to example embodiments, reliable link layer multicast can be implemented in a low power wide area network that utilizes only single-hop link layer connections between constrained wireless network devices and wired gateways. The example embodiments enable reliable link layer multicast without the necessity of any network layer topology or any routing protocol requirements for the constrained wireless network devices; hence, the constrained wireless network devices can operate using minimal data link requirements, for long term battery power conservation. Further, the collision-avoidance methods deployed in the wired gateways under the control of the management device enable a minimized and controlled multicasting on the wireless data links, regardless of the density of the wired gateways in the low power wide area network.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:
1. A method comprising:
generating and sending, by a management device for a mesh-free and network topology-free low power wide area network established without requiring a routing protocol and comprising wired gateways and con- strained wireless network devices each associated with one or more of the wired gateways via a wireless link layer connection, a link layer multicast listener command as a unicast transmission to each constrained wireless network device via the associated wired gateway, the wired gateways coupled to the management device via respective wired connections, the link layer multicast listener command specifying a listening interval selected by the management device, the link layer multicast listener command causing each constrained wireless network device in response to receipt thereof to change from a low-power optimized mode to a listening mode until reception of a multicast data packet within the listening interval;

generating, by the management device, a set of collision avoidance parameters for execution by each wired gateway, the collision avoidance parameters including a minimum waiting interval, a maximum waiting interval relative to the listening interval, and a redundancy constant; and sending, by the management device, an instruction to the wired gateways via the respective wired connections to selectively transmit the multicast data packet based on the collision avoidance parameters, the instruction causing each wired gateway to wait a randomly-selected wait interval, relative to the minimum waiting interval and the maximum waiting interval, and after the wait interval selectively transmit the multicast data packet only if a received number of the multicast data packet by the corresponding wired gateway is less than the redundancy constant.

2. The method of claim 1, further comprising:
identifying a maximum idle interval corresponding to initiation of a second listening interval for a second multicast packet following initiation of the listening interval of the multicast data packet as a first listening interval;

outputting, to one of each wired gateway or each constrained wireless network device via the corresponding associated wired gateway, the maximum idle interval by the initiation of the first listening interval, the maximum idle interval causing each constrained wireless network device to enter the low-power optimized mode, in response to receipt of the multicast data packet, until the initiation of the second listening interval.

3. The method of claim 2, wherein:
the maximum idle interval is sent by the management device to each wired gateway;
the maximum idle interval causes each wired gateway to calculate a next-listening interval, relative to the maximum idle interval minus a corresponding transmission time instance of the multicast data packet by the corresponding wired gateway, and transmit the next-listening interval with the multicast data packet;
the next-listening interval causing the wireless network device to resume the listening mode, following entering the low-power optimized mode, for the initiation of the second listening interval.

4. The method of claim 2, further comprising the management device recalculating the maximum idle interval for initiation of a third listening interval for a third multicast packet following the initiation of the second listening interval of the second multicast data packet.

5. The method of claim 2, wherein the outputting includes inserting the maximum idle interval into the link layer multicast listener command.

6. The method of claim 2, further comprising fragmenting a received data structure into the at least the multicast data packet and the second multicast packet, for distribution of the data structure to the constrained wireless network devices.

7. The method of claim 1, wherein the management device generates a second set of collision avoidance parameters for at least one of the wired gateways determined by the management device to have priority over others of the wired gateways.

8. One or more non-transitory tangible media encoded with logic for execution by a machine and when executed by the machine operable for:

generating and sending, by the machine implemented as a management device for a mesh-free and network topology-free low power wide area network established without requiring a routing protocol and comprising wired gateways and constrained wireless network devices each associated with one or more of the wired gateways via a wireless link layer connection, a link layer multicast listener command as a unicast transmission to each constrained wireless network device via the associated wired gateway, the wired gateways coupled to the management device via respective wired connections, the link layer multicast listener command specifying a listening interval selected by the management device, the link layer multicast listener command causing each constrained wireless network device in response to receipt thereof to change from a low-power optimized mode to a listening mode until reception of a multicast data packet within the listening interval;

generating, by the management device, a set of collision avoidance parameters for execution by each wired gateway, the collision avoidance parameters including a minimum waiting interval, a maximum waiting interval relative to the listening interval, and a redundancy constant; and sending, by the management device, an instruction to the wired gateways via the respective wired connections to selectively transmit the multicast data packet based on the collision avoidance parameters, the instruction causing each wired gateway to wait a randomly-selected wait interval, relative to the minimum waiting interval and the maximum waiting interval, and after the wait interval selectively transmit the multicast data packet only if a received number of the multicast data packet by the corresponding wired gateway is less than the redundancy constant.

9. The one or more non-transitory tangible media of claim 8, further operable for:
identifying a maximum idle interval corresponding to initiation of a second listening interval for a second multicast packet following initiation of the listening interval of the multicast data packet as a first listening interval;

outputting, to one of each wired gateway or each constrained wireless network device via the corresponding associated wired gateway, the maximum idle interval by the initiation of the first listening interval, the maximum idle interval causing each constrained wireless network device to enter the low-power optimized mode, in response to receipt of the multicast data packet, until the initiation of the second listening interval.

10. The one or more non-transitory tangible media of claim 9, wherein:

the maximum idle interval is sent by the management device to each wired gateway;

the maximum idle interval causes each wired gateway to calculate a next-listening interval, relative to the maximum idle interval minus a corresponding transmission time instance of the multicast data packet by the corresponding wired gateway, and transmit the next-listening interval with the multicast data packet;

the next-listening interval causing the wireless network device to resume the listening mode, following entering the low-power optimized mode, for the initiation of the second listening interval.

11. The one or more non-transitory tangible media of claim 9, further operable for the management device recalculating the maximum idle interval for initiation of a third listening interval for a third multicast packet following the initiation of the second listening interval of the second multicast data packet.

12. The one or more non-transitory tangible media of claim 9, wherein the outputting includes inserting the maximum idle interval into the link layer multicast listener command.

13. The one or more non-transitory tangible media of claim 9, further operable for fragmenting a received data structure into the at least the multicast data packet and the second multicast packet, for distribution of the data structure to the constrained wireless network devices.

14. The one or more non-transitory tangible media of claim 8, wherein the management device generates a second set of collision avoidance parameters for at least one of the wired gateways determined by the management device to have priority over others of the wired gateways.

15. A method comprising:

receiving, by a wired gateway providing a wireless link layer connection for one or more constrained wireless network devices in a mesh-free and network topology-free low power wide area network established without requiring a routing protocol, a link layer multicast listener command for unicast transmission to each of the one or more constrained wireless network devices, each link layer multicast listener command received via a wired connection with a management device and specifying a listening interval;

transmitting, by the wired gateway, each link layer multicast listener command to the corresponding constrained wireless network device as a corresponding unicast transmission, the link layer multicast listener command causing the corresponding constrained wireless network device in response to receipt thereof to change from a low-power optimized mode to a listening mode until reception of a multicast data packet within the listening interval;

receiving an instruction, from the management device via the wired connection, for selective transmission of the multicast data packet based on collision avoidance parameters specified in the instruction, the collision avoidance parameters including a minimum waiting interval, a maximum waiting interval relative to the listening interval, and a redundancy constant; and selectively transmitting, by the wired gateway, the multicast data packet based on randomly selecting a wait interval relative to the minimum waiting interval and the maximum waiting interval, waiting the wait interval following initiation of the listening interval, and after the wait interval selectively transmitting the multicast data packet only if the wired gateway has wirelessly received less than the redundancy constant of the multicast data packets from one or more other wired gateways.

16. The method of claim 15, further comprising:

receiving, from the management device via the wired connection, a maximum idle interval corresponding to initiation of a second listening interval for a second multicast packet following initiation of the listening interval of the multicast data packet;

identifying, by the wired gateway, a first transmission time instance for the multicast data packet by the wired gateway;

calculating a next-listening interval, relative to the maximum idle interval minus the transmission time instance; and transmitting the next-listening interval with the transmission of the multicast data packet, the next-listening interval causing each constrained wireless network device to enter the low-power optimized mode in response to receipt of the multicast data packet, and resume the listening mode upon initiation of the second listening interval.

17. The method of claim 15, wherein the multicast data packet is one of a plurality of multicast data fragments of a data structure, each multicast data fragment having a corresponding listen interval for reception by the constrained wireless network devices, the method further comprising:

receiving, by the wired gateway from one of the constrained wireless network devices, a bitmap identifying received multicast data fragments of the data structure;

identifying, by the wired gateway based on the bitmap, missing multicast data fragments that were not received by the one wireless network device; and unicast transmitting, by the wired gateway, the missing multicast data fragments to the one constrained wireless network device, enabling the one constrained wireless network device to recover the data structure from the multicast data fragments.

18. One or more non-transitory tangible media encoded with logic for execution by a machine and when executed by the machine operable for:

receiving, by the machine implemented as a wired gateway providing a wireless link layer connection for one or more constrained wireless network devices in a mesh-free and network topology-free low power wide area network established without requiring a routing protocol, a link layer multicast listener command for unicast transmission to each of the one or more constrained wireless network devices, each link layer multicast listener command received via a wired connection with a management device and specifying a listening interval;

transmitting, by the wired gateway, each link layer multicast listener command to the corresponding constrained wireless network device as a corresponding unicast transmission, the link layer multicast listener command causing the corresponding constrained wireless network device in response to receipt thereof to change from a low-power optimized mode to a listening mode until reception of a multicast data packet within the listening interval;

receiving an instruction, from the management device, for selective transmission of the multicast data packet based on collision avoidance parameters specified in the instruction, the collision avoidance parameters including a minimum waiting interval, a maximum waiting interval relative to the listening interval, and a redundancy constant; and selectively transmitting, by the wired gateway, the multicast data packet based on randomly selecting a wait interval relative to the minimum waiting interval and the maximum waiting interval, waiting the wait interval following initiation of the listening interval, and after the wait interval selectively transmitting the multicast data packet only if the wired gateway has wirelessly received less than the redundancy constant of the multicast data packets from one or more other wired gateways.

19. The one or more non-transitory tangible media of claim 18, further operable for:

receiving, from the management device via the wired connection, a maximum idle interval corresponding to initiation of a second listening interval for a second multicast packet following initiation of the listening interval of the multicast data packet;

identifying, by the wired gateway, a first transmission time instance for the multicast data packet by the wired gateway;

calculating a next-listening interval, relative to the maximum idle interval minus the transmission time instance; and transmitting the next-listening interval with the transmission of the multicast data packet, the next-listening interval causing each constrained wireless network device to enter the low-power optimized mode in response to receipt of the multicast data packet, and resume the listening mode upon initiation of the second listening interval.

20. The one or more non-transitory tangible media of claim 18, wherein the multicast data packet is one of a plurality of multicast data fragments of a data structure, each multicast data fragment having a corresponding listen interval for reception by the constrained wireless network devices, further operable for:

receiving, by the wired gateway from one of the constrained wireless network devices, a bitmap identifying received multicast data fragments of the data structure;

identifying, by the wired gateway based on the bitmap, missing multicast data fragments that were not received by the one wireless network device; and unicast transmitting, by the wired gateway, the missing multicast data fragments to the one constrained wireless network device, enabling the one constrained wireless network device to recover the data structure from the multicast data fragments.

* * * * *